United States Patent
Marshall

(10) Patent No.: US 7,130,424 B2
(45) Date of Patent: Oct. 31, 2006

(54) SYSTEMS AND METHODS FOR UTILIZING AN APPLICATION FROM A NATIVE PORTABLE DEVICE WITHIN A NON-NATIVE COMMUNICATIONS NETWORK

(75) Inventor: Maria I. Marshall, Oceanside, CA (US)

(73) Assignee: Qualcomm, Inc., San Diego, CA (US)

( * ) Notice: Subject to any disclaimer, the term of this patent is extended or adjusted under 35 U.S.C. 154(b) by 0 days.

(21) Appl. No.: 10/325,335

(22) Filed: Dec. 19, 2002

(65) Prior Publication Data

US 2004/0123095 A1    Jun. 24, 2004

(51) Int. Cl.
*H04K 1/10* (2006.01)
*H04K 1/00* (2006.01)
*H04L 9/00* (2006.01)

(52) U.S. Cl. .................. 380/33; 380/257; 380/270; 713/153

(58) Field of Classification Search .................. 713/153
See application file for complete search history.

(56) References Cited

U.S. PATENT DOCUMENTS 5,410,599 A * 4/1995 Crowley et al. ............ 380/269

OTHER PUBLICATIONS

Chin Shakukun, JP 022001339486A, "Device for Conversion Between Portable Telephone and Fixed Network Telephone", Dec. 7, 2001.*

* cited by examiner

*Primary Examiner*—Kambiz Zand
(74) *Attorney, Agent, or Firm*—Philip R. Wadsworth; Sandip (Micky) S. Minhas; Abdollah Katbab

(57) ABSTRACT

The disclosed systems and methods include a native portable communications device having an application module that modifies communications between the portable device and a non-native communications device connected to a non-native communications network. The application module transforms communications between a native standard to a non-native standard to allow interoperability between the native portable communications device and the non-native communications device within the non-native communications network. Further, the application module may modify communications in other manners, such as to apply a security function to the communication. Additionally, the systems and methods may include a communications accessory for switching communications between the application module of the native device, the non-native device, and the non-native network. Thus, the native portable communications device and the associated methods of operation with the application module provide a mobile system that enables modified communications over various communications networks.

39 Claims, 6 Drawing Sheets

_US 7,130,424 B2_

SYSTEMS AND METHODS FOR UTILIZING AN APPLICATION FROM A NATIVE PORTABLE DEVICE WITHIN A NON-NATIVE COMMUNICATIONS NETWORK

BACKGROUND AND RELATED ART

This invention relates to systems and methods for modifying communications within a communications network, and, more particularly, to systems and methods for utilizing an application from a portable device within a "non-native" communications network, or in other words, a communications network with which the portable device was not originally intended to communicate.

The complexity of communications systems are ever-increasing due to the increasing number of different types of communications devices and different types of communications networks. For example, portable or wireless devices, wireline and wireless phones, and desktop and portable computers are increasingly used in conjunction on one or more communications networks, each having different standards and protocols, to transfer all different types of information. Such information includes, for example, voice data, audio data and video data. Because of the differences in communications standards and protocols between the various communications networks, a given communication device is typically designed for operation with a specific communications network. For example, a typical wireless phone designed for native operation on a Global System for Mobile ("GSM") communications network will not be able to communicate on a non-native Code-Division Multiple Access ("CDMA") communications network. In another example, a typical portable device designed for operation on a native BLUETOOTH™ communications network is not operable on a non-native GSM network. Thus, there is a need to improve the interoperability of the plethora of communications devices with the plethora of communications networks to enable applications to be utilized on both native and non-native communication networks.

Additionally, in some cases, a party receiving or transmitting the information desires the communication to be modified prior to its receipt or transmission. One example of a modified communication is a communication that is encrypted or decrypted by a security application. An encrypted communication is referred to as a secure communication, as only a party having the proper decryption algorithm or key may understand it. For example, a party transmitting sensitive or confidential information may desire to transmit it as a secure communication, such as by scrambling the communication using an encryption algorithm or key. Upon receiving the secure communication and applying the corresponding decryption algorithm or key, one may obtain the original or clear communication. Thus, private and secure communications may be achieved over a variety of public communications networks.

Current solutions for establishing secure communications over public communications networks, such as the public switched telephone network or wireless networks, have a number of drawbacks. Most secure communications products are not portable. Typically, these products comprise desktop units that require a physical interconnection between a wireline phone handset and its base unit, or between the base unit and a wall interface to the public switched telephone network. Depending on whether voice or data communications are to be secured, some products may require the connection to be physically changed. For example, some products require a connection to a computer for secure data communications. This requirement of continuously having to change the connection leads to consumer dissatisfaction because of the continuous need to connect and disconnect the various devices based on the use. Further, these products require security applications to be locally resident within the product. This local residence of the security application exposes the secure aspects of the product to tampering. Further, an item having encryption technology may be considered a Controlled Cryptographic Item ("CCI"). A CCI device is defined as secure telecommunications or information handling equipment, with an associated cryptographic component, that is governed by a special set of control requirements that may add additional cost to an item due to special handling, storage and export restrictions. Additionally, some of these secure communication products are not universally compatible with any type of wireline phone. Finally, most of these products are very expensive.

Thus, improved systems and methods of interoperable communications between devices and networks are desired, along with more flexible systems and methods of modifying a communication relying on a variety of public communications networks.

SUMMARY OF THE DISCLOSURE

In one embodiment, a communications system comprises a first application module and a first interface module. The first application module is connectable with a first portable communications device operable within a native communications network having a native communications standard. The first application module is operable for transforming an outgoing native communication into an outgoing non-native communication, or operable for transforming an incoming non-native communication into an incoming native communication. The incoming native communication is compatible with the native communications network, and the outgoing non-native communication is compatible with a non-native communications standard associated with a non-native communications network. The first interface module is in communication with the first application module and connectable to a second communications device operable within the non-native communications network. The first interface module is operable for transmitting and receiving both native and non-native communications.

In another embodiment of the invention, a communications accessory includes an interface system operable for communication with at least two of a non-native device, a portable device having an application module and a non-native communications network. The communications accessory further includes a switch mechanism having at least a first mode and a second mode of operation. In the first mode the switch mechanism allows communications between the non-native device and the non-native communications network to be modified by the application module of the portable device. In the second mode the switch mechanism allows communications between the non-native device and the non-native communications network without modification by the application module of the portable device.

In another embodiment, a secure communications accessory includes an interface system operable for communication with at least two of a non-native device, a portable device having a security application and a non-native communications network. The communications accessory further includes a switch mechanism having a first mode and a second mode of operation. In the first mode the switch mechanism routes communications between the non-native device and the non-native communications network through the security application of the portable device. In the second mode the switch mechanism connects the non-native device and the non-native communications network without routing communications through the security application of the portable device.

In yet another embodiment, a communications accessory includes a number of interface systems and a switch system interconnecting the interface systems. The interface systems include a non-native interface system, a public switched telephone network interface system and a portable device interface system. The non-native device interface system is connectable with a non-native device. The public switched telephone network interface system is connectable with a public switched telephone network. The portable device interface system is connectable with a portable device having an application module. And, the switch system is operable for transmitting communications between at least two of the non-native device interface system, the public switched telephone network interface system and the portable device interface system. The switch system includes at least a first connection state and a second connection state. In the first connection state the switch system connects the non-native device interface system and the public switched telephone network interface system through the portable device interface system such that the transmitted communications are modified by the application module. In the second connection state the switch system connects the non-native device and the public switched telephone network and bypasses the portable device interface system.

In a further embodiment, a communications system includes a communications accessory and a portable device. The communications accessory has an interface system for transmitting communications, wherein the communications accessory is connectable with at least a non-native device and a non-native communications network. The portable device has an application module, wherein the portable device is connectable with the communications accessory. And, the interface system has at least a first mode and a second mode of operation. In the first mode the interface system allows communications between the non-native device and the non-native communications network to be modified by the application module of the portable device. In the second mode the interface system allows communications between the non-native device and the non-native communications network without modification by the application module of the portable device.

In another embodiment, a method of modifying a communication between a non-native device and a non-native communications network includes receiving a first communication from a first one of either the non-native device or the non-native communications network. The first communication is directed to a portable device having an application module. A second communication is received from the portable device, where the second communication includes a transformation of the first communication effected by the application module. And, the method further includes directing the second communication to a second one of either the non-native device or the non-native communications network, where the first one and the second one are not the same. Thus, the method allows for a communication between the non-native device and the non-native communications network that may be selectively modified by the application module of the portable device.

DETAILED DESCRIPTION OF EXEMPLARY EMBODIMENTS

Figure 1:
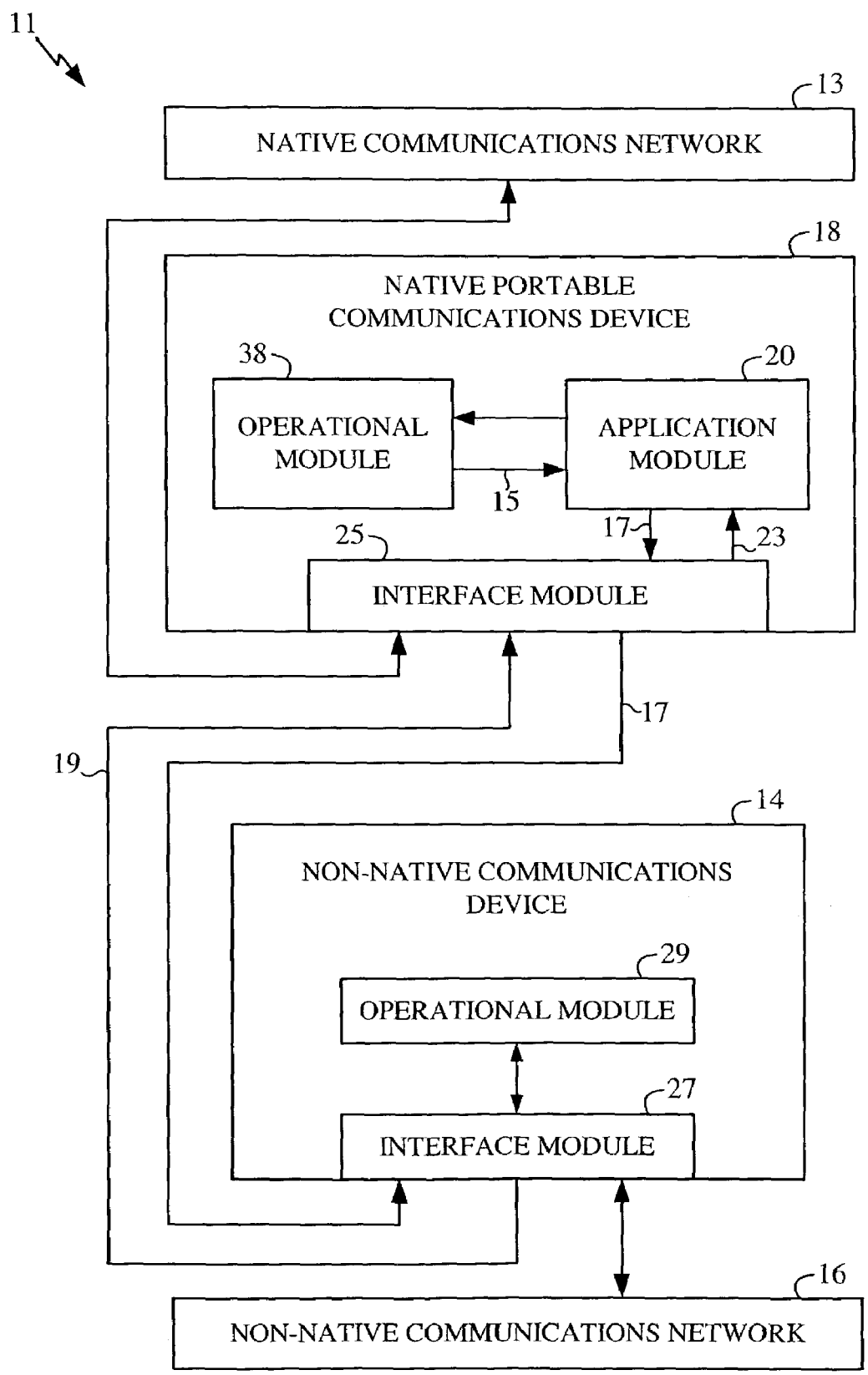
FIG. 1 is a schematic diagram of one embodiment of a communications system including a native portable communications device, operable on a native communications network, and having an application module for enabling communications with a non-native communications network.

Referring to FIG. 1, one embodiment of a communications system 11 includes a native portable communications device 18 having an application module 20 that modifies communications between the portable device and a non-native communications device 14 connected to a non-native communications network 16. Application module 20 transforms communications between a native standard to a non-native standard to allow interoperability between native portable communications device 18 and non-native communications device 14 within native communications network 13 and non-native communications network 16. Further, application module 20 may modify communications in other manners, such as to apply a security function to the communication. As such, application module 20 may include any application implemented in hardware or software that modifies original analog or digital data before passing it on to a non-native communications system or device. Thus, native portable communications device 18 with application module 20 provides a mobile system that enables modified communications over various communications networks.

Native portable communications device 18 includes an operational module 38 enabling operation of the portable device within native communications network 13 having a native communications standard. Application module 20 is operable for transforming an outgoing native communication 15 into an outgoing non-native communication 17 that allows native portable device 18 to interact with non-native device 14 and non-native network 16. Further, application module 20 is operable for transforming an incoming non-native communication 19 into an incoming native communication 23 that allows further interoperability. The modified communications are thus compatible across networks, as incoming native communication 23 is compatible with native communications network 13 and outgoing non-native communication 17 is compatible with a non-native communications standard associated with non-native communications network 16.

Additionally, interface module 25 is in communication with application module 20 and connects to an interface module 27 of non-native communications device 14, as well as connecting to native communications network 13. For example, interface modules 25, 27 may include a mechanical interconnection, such as through a cable, or a physical interconnection, such as through infra-red ("IR") light waves or other non-contact mechanisms. Interface module 25 is operable for transmitting and receiving both native and non-native communications 17, 19, transferring them to or from application module 20.

Non-native communications device 14 includes an operational module 29 enabling operation of the non-native device within non-native communications network 16 having a non-native communications standard. Through interaction with native portable communications device 18, non-native device 14 achieves enhanced communications functionality, based on the capabilities of application module 20, to transmit and receive modified communications across non-native network 16 or to become interoperable with native network 13.

Figure 2:
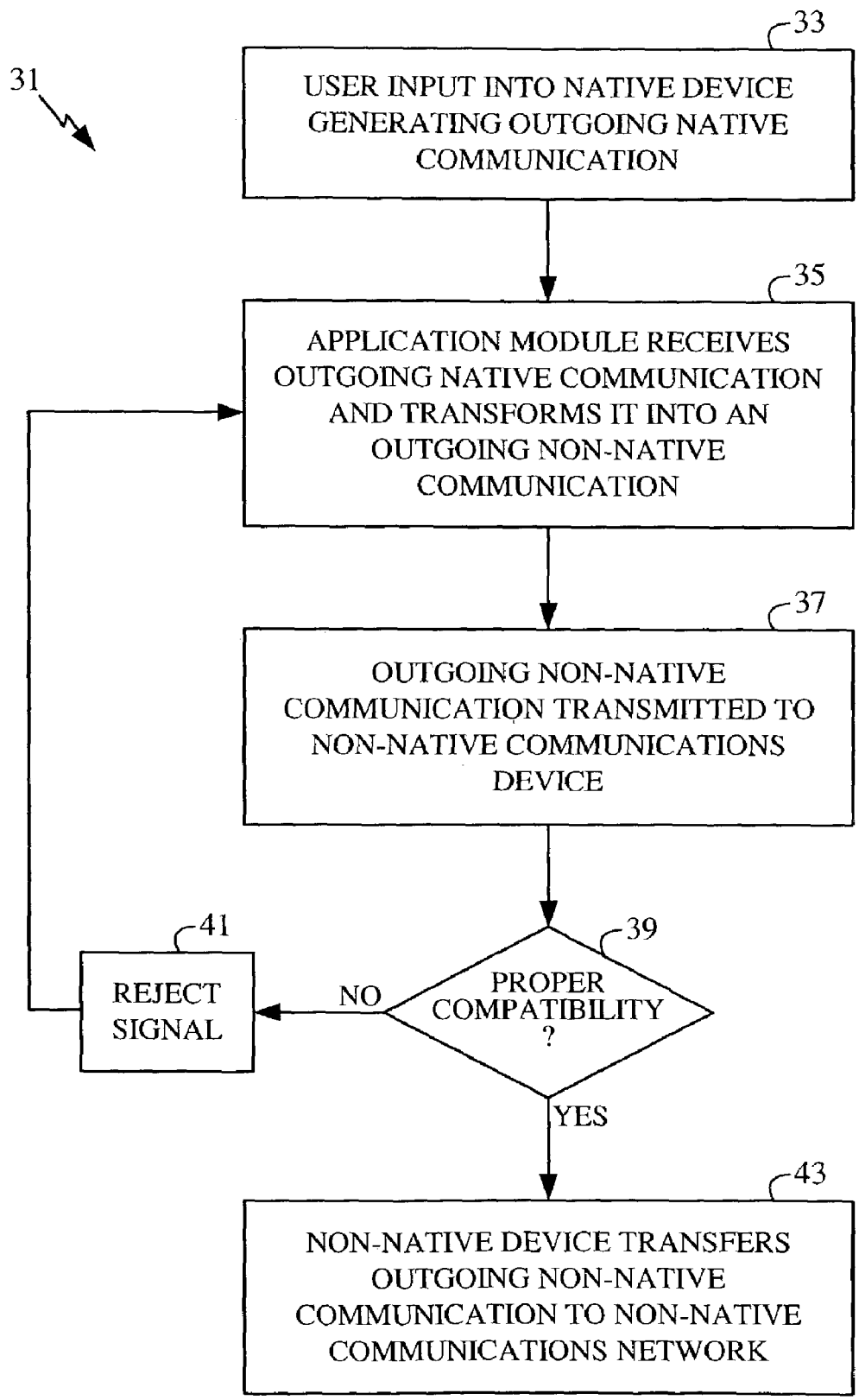
FIG. 2 is a flow diagram of one embodiment of a method of operation that allows communications between an end user having a native portable communications device and a non-native communications network.

In one method of operation 31, referring to FIG. 2, system 11 allows communications between an end user having a native portable communications device and a non-native communications network. In this embodiment, the end user generates an input, in the form of a native communication, into a native portable communications device (Block 33). The native communication is sent to the application module which modifies the native communication and transforms it into an outgoing non-native communication (Block 35).

The outgoing non-native communication represents the native communication, but in a transport format compatible with a non-native communications network. For example, the native communication may include one or more native commands that may have corresponding non-native commands. The application module, which may include a plurality of native and non-native commands, may determine the corresponding non-native command and modify the form of the native communication to replace the native command with the corresponding non-native command. Such a determination by application module may be based on a know relationship between native and non-native commands, or may be based on a trial-and-error process. For example, in a trial-and-error process, the application module may select one of the plurality of non-native commands, transform the native communication to a first non-native communication using the first selected non-native command, and transmit the non-native communication. If the non-native communications device rejects the non-native communication, then the application module may select a second one of the plurality of non-native commands and create a second non-native communication. Communication attempts would continue with the non-native communications device until the proper form of non-native communication is found.

Continuing with method of operation 31, the outgoing non-native communication (Block 35) is transmitted to the non-native communications device (Block 37). The non-native communications device receives the outgoing non-native communication and may check its compatibility with the non-native communications network (Block 39). If the communication is not compatible, then a signal rejecting the communication is sent back to native portable device (Block 41) and the modification process (Block 35) is repeated. If the non-native device finds the non-native communication to be compatible, then it forwards the communication to the non-native communications network (Block 43).

Figure 3:
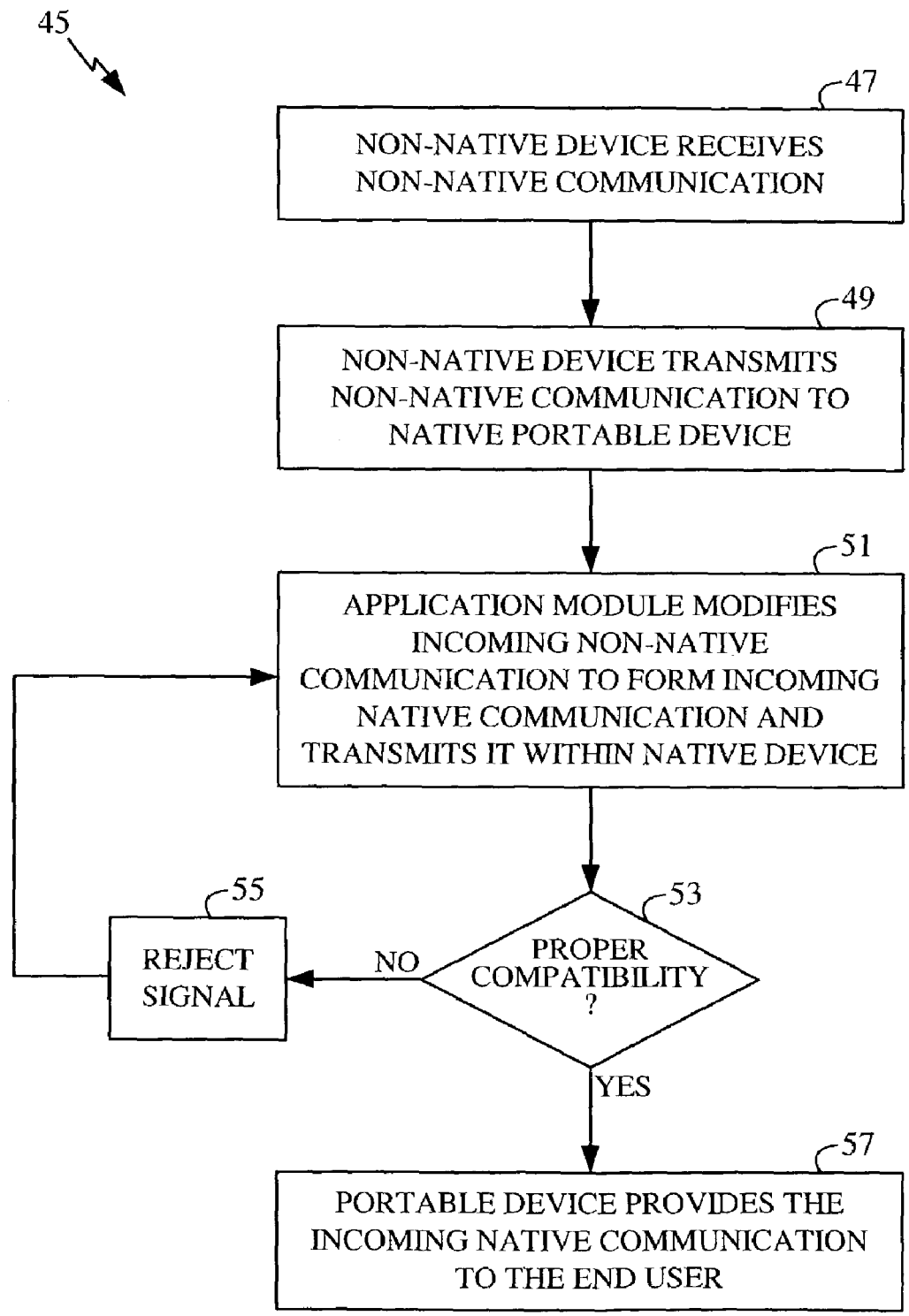
FIG. 3 is a flow diagram of one embodiment of a method of operation that allows communications between a non-native device associated with a non-native communications network and an end user having a native portable communications device.
Figure 4:
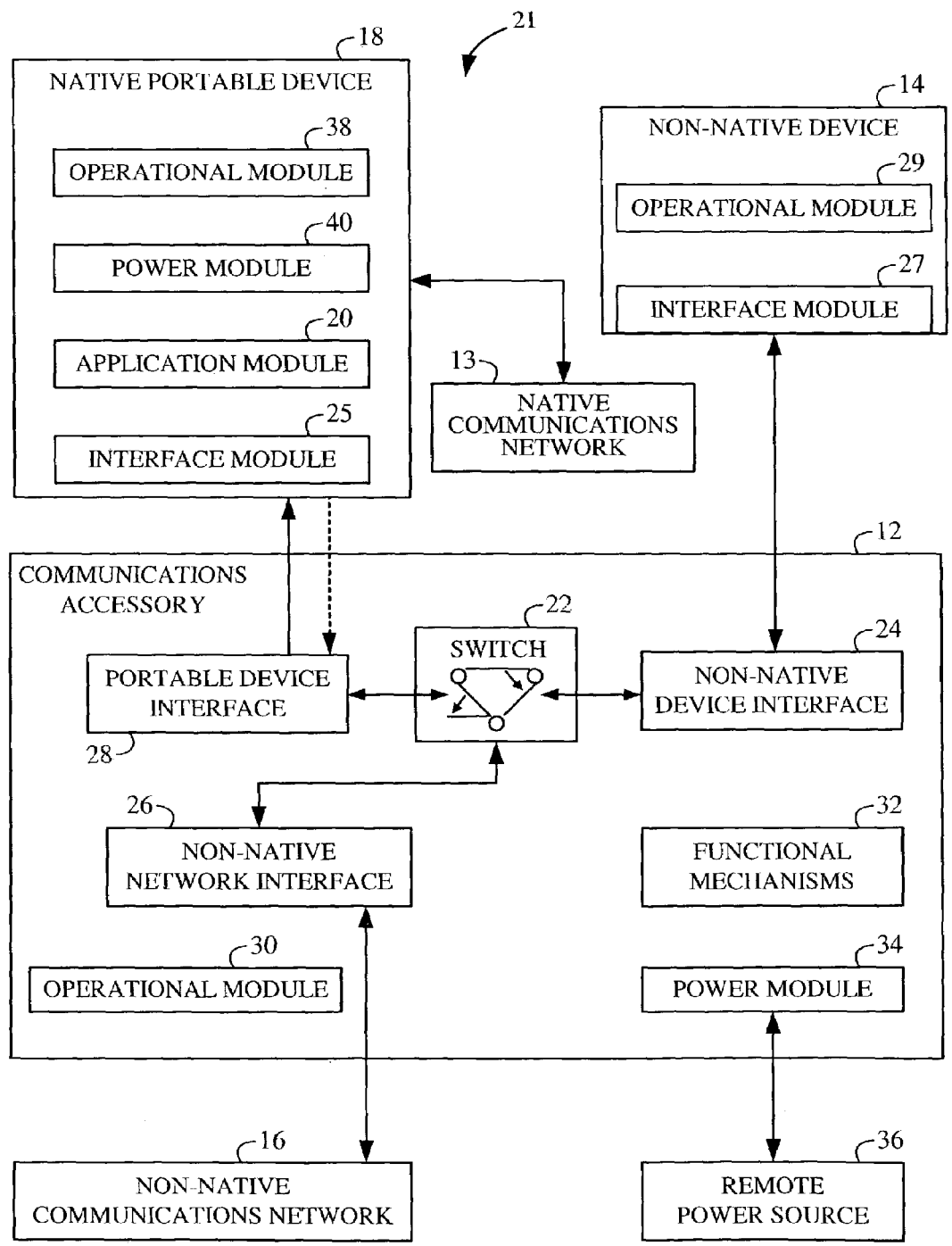
FIG. 4 is a schematic diagram of one embodiment of a communications system, including an embodiment of a communications accessory, a wireless communications device, a non-native device and a non-native communications network.

In another method of operation 45, referring to FIG. 3, system 11 allows communications between a non-native device associated with a non-native communications network and an end user having a native portable communications device. In this embodiment, the non-native device receives a non-native communication from the non-native network (Block 47). The non-native device transmits the non-native communication to the native portable device (Block 49). The native portable device receives the non-native communication, and the application module modifies the incoming non-native communication to transform it into an incoming native communication compatible with the native portable device and the native communications network, and transmits the modified communication within the native portable device to the end user (Block 51). The transformation of the communication by the application module occurs in the same manner as described above with regard to method of operation 31 (FIG. 2), but in the opposite direction, i.e. switching from non-native to native compatibility. The newly modified incoming native communication may be transmitted to the operational module or interface module of the native device, which checks the compatibility of the communication (Block 53). If the communication is not compatible, a signal rejecting the communication is sent to application module (Block 55) and the transformation process is repeated (Block 51). If the communication is compatible, then it is output to the end user (Block 57).

Thus, in both methods of operation 31, 45, the application module acts as a virtual modem that allows interoperability between a native portable communications device and a non-native communications device. Further, this interoperability allows the non-native device to utilize the functionality of the application module for communicating with the non-native communications network.

Referring to FIG. 3, in another embodiment, a communications system 21 includes an interface device or communications accessory 12 for transmitting communications between at least two of a non-native communications device 14, a non-native communications network 16 and native portable device 18 having application module 20. The communications accessory 12 includes a switch system 22 having at least a first mode and a second mode. In the first mode, switch system 22 connects non-native device 14 and non-native communications network 16 through portable device 18. This first mode connection allows a communication through communications accessory 12 between non-native device 14 and non-native communications network 16 to be modified by application module 20. In the second mode, switch system 22 bypasses portable device 18 in connecting non-native device 14 and non-native communications network 16. This second mode connection allows substantially direct communications between non-native device 14 and non-native communications network 16 through communications accessory 12, or at least the second mode allows communications without modification by application module 20. Thus, communications system 10 and communications accessory 12, via switch system 22, allow communications through the communications accessory to be selectively modified by application module 20 of portable device 18.

For example, in one embodiment, communications accessory 12 may be utilized as a secure wireline telephone product for encryption and decryption of wireline voice and data calls through non-native communications network 16, such as a Public Switched Telephone Network ("PSTN"). In this instance, application module 20 includes a security application having an encryption/decryption algorithm. Operation of communications accessory 12 with switch system 22 in the first mode and interfaced with portable device 18, for example, allows an incoming encrypted or secure communication from non-native communications network 16 to be modified by application module 20 to form a decrypted or clear communication transmittable to non-native device 14. Alternatively, an outgoing clear communication from non-native device 14 can be encrypted to form a secure communication transmittable to non-native communications network 16. Operation of communications accessory 12 with switch system 22 in the second mode allows clear communications between non-native device 14 and non-native communications network 16. Thus, in this example, communications accessory 12 interfaces with portable device 18 to utilize a security application within application module 20 to transform a standard wireline telephone device into a secure voice/data wireline telephone device for communication with a public communications network.

Communications accessory 12 may include one or a combination of a "bump-in-the-cord" communications module, a docking station, a dual device charger, or any other similar type of device capable of interfacing between a non-native device, a non-native communications network and a portable device. Communications accessory 12 includes at least a non-native device interface 24, a non-native communications interface 26 and a portable device interface 28 that may be selectively connected through switch system 22. Non-native device interface 24, non-native communications network interface 26 and portable device interface 28, respectively, may include any type of connector for transmittably connecting non-native device 14, non-native communications network 16 and portable device 18, respectively, to communications accessory 12. For instance, suitable interfaces 24, 26, 28 may include a mechanical connector such as an RJ-11 port, a USB ports, an RS-232 port, a wireless transmit/receive device such as a radio frequency ("RF") or radio wave transponder, an infrared ("IR") or other light wave transponder and an electrical/magnetic transmitter/receiver, and a modem. Interfaces 24, 26, 28 may include a plurality of interfaces for connecting with a plurality of complementary devices/systems or portions of such devices/systems. For example, non-native device interface 24 may include a first interface for connection with a corded handset and a second interface for connection with a base unit. Additionally, non-native device interface 24 and portable device interface 28 may include a cradle or other structure for holding or supporting non-native device 14 and portable device 18, respectively.

As discussed above, communications accessory 12 includes switch system 22 for transmittably interconnecting interfaces 24, 26, 28. Switch system 22 may include any type of hardware or software operable for selectively routing a communication among interfaces 24, 26, 28. For instance, switch system 22 may include one or more multiplexers for interconnecting the various routing circuitry within communications accessory 12. These multiplexers may be controlled by command signals from portable device 18 for selectively changing their routing configuration. In one embodiment, for example, a default configuration would allow voice communications to travel unimpeded between non-native device interface 24 and non-native communications network interface 26. The multiplexers may be two-, three- and four-state or more to provide the required routing for all possible operational modes. Further, the secure or "red" portions of switch system 22 may be independent or isolated from the clear or "black" portions to further guarantee the integrity of the communication modified by application module 20.

Additionally, communications accessory 12 may include an interface operational module 30 having one or a combination of hardware, software and firmware for use in controlling the interoperability of the various components of communications accessory 12, or for aiding interoperability with non-native device 14, non-native communications network 16 or portable device 18. It should be noted, however, that interface operational module 30 may be an optional component of communications accessory 12. Exemplary embodiments of interface operational module 30 may include one, or varying combinations, of a microcontroller, a central processing unit ("CPU"), random access memory ("RAM"), read-only memory ("ROM"), input/output ("I/O") ports, operating system software, application software, interfacing software, and various circuitry. Further, for example, interface operational module 30 may provide state or status signals representative of various states or statuses of communications accessory 12. Examples of state/status signals include: an identification signal that may be transmitted to non-native device 14 or portable device 18 to indicate the presence of communications accessory; one or more line status signals transmittable to non-native device 14 or portable device 18 to indicate a status of the other device, for example, a signal to portable device 18 that non-native device 14 is off the hook or already connected to a call, or a signal to non-native device 14 that portable device 18 or non-native communications network 16 is connected to communications device 12; and one or more monitoring signals indicative of a mode or state of all or portions of switching system 22, where such monitoring signals may be transmitted to one or more functional mechanisms 32 associated with communications accessory 12, as will be discussed below in more detail.

Interface operation module 30 may provide the functional and operational support for each operational mode of communications accessory 12 and associated non-native device 14 and portable device 18. Such operational modes include: clear voice pass through; secure voice; secure data; clear to secure transitions; battery charging operations; receiving over-the-air ("OTA") calls on portable device 18 without interfering with non-native device 14 activities; and transparent call delivery or forwarding from connected portable device 18 to non-native device 14. Further, interface operational module 30 may help support any type of communication protocol or application usable with communications accessory 12, such as: analog or digital data or voice; conversion protocols such as pulse code modulation ("PCM"); secure and clear voice over Internet protocol ("VoIP") communications; group services/group communications applications, such as those using SIP, SDP, TCP/IP and UDP protocols; integrated services digital network ("ISDN") protocol; and other such protocols.

As mentioned above, communications accessory 12 may include one or more functional mechanisms 32 for controlling or supplementing the operation of the communications accessory. Suitable examples of a functional mechanism 32 include any sensory input or output device such as a virtual or mechanical keypad or user input, virtual or mechanical function keys, an audio or visual output device such as a speaker or a display or a light-emitting device, an analog or digital answering machine, a user interface, a haptic input or output device, and other similar mechanisms used with phone-related devices. For example, the virtual or mechanical keypad or user input may be used to dial a telephone number or select an input on non-native device 14 or portable device 18. Virtual or mechanical function keys may be used to control a specific operation or feature of communications accessory 12 or any of the interfaced devices/ networks. Audio or visual output devices may be linked to any component of, or device/network interfaced with, communications accessory 12 for signaling information, such as a status, state or mode, relating to such component/device/ network. For example, a speaker may be used to form a speakerphone for non-native device 14 or portable device 18. Further, a light-emitting device may be used, for example, to indicate that communications accessory 12 has power, or to signal the operation of one or more of the modes of switch system 22. An analog or digital answering machine may be connectable with non-native device 14 or portable device 18 to provide automatic answering capabilities. A user interface may function to operate communications accessory 12 or one of the interfaces devices/networks, or to display, for example, incoming caller identification information.

Communications accessory 12 may further include a power module 34, connectable with a remote power source 36, for providing operational or back-up power to communication accessory 12, non-native device 14 and/or portable device 18. Remote power source 36 may include any alternating current or direct current power supply, such as a battery, a generator or an electrical power grid. For example, power module 34 may provide operational power to switch system 22, non-native device 14, interface operational module 30 and functional mechanisms 32. Further, for example, power module 34 may provide the power to charge a battery associated with portable device 18, or to illuminate a light-emitting device associated with functional mechanism 32. Additionally, power module 34 may include other components, such as a transformer, a back-up/emergency power source, a cord, and any other system for interconnecting and energizing communications accessory 12. The transformer may be utilized for converting the power received from remote power source 36 into a format usable by the connected devices. The back-up or emergency power source, such as a battery pack, may be utilized for powering communication accessory 12 and the interfaced devices during periods when the supply of power from remote power source 36 is interrupted.

Non-native device 14 may include any apparatus operable for communicating with a non-native communications network, such as a PSTN. Suitable examples of non-native device 14 include a standard, corded wireline phone/handset, a portable wireline phone/handset, a modem, and a computer. Non-native device 14 may include one or more of a speaker, a receiver, a keypad, a display, an input/output, an answering machine, or function keys for controlling various operations of the device.

Non-native communications network 16 may include any public or private communications network having a communications standard that is not compatible with the communications standard of native communications network 13. Non-native communications network 16 may carry analog or digital communications, and may include voice, data, video and other similar types of information. Suitable examples of non-native communications network 16 include a Public Switched Telephone Network ("PSTN"), an Integrated Services Digital Network ("ISDN"), a Fiber Distributed Data Interface ("FDDI") network, an FDDI Full Duplex Technology ("FFDT") network and other similar types of networks.

Portable device 18 may include any type of device capable of supporting application module 20 and operating with communications accessory 12. For example, portable device 18 may include a personal computer, a wireless device such as a cellular or satellite phone, a personal digital assistant, a pager, a two-way communicator, and other hand-held or pocket-sized electronic devices. Portable device 18 may include at least an operational module 38, which may incorporate hardware, software and firmware for communications with communications accessory 12 and application module 20. Operational module 38 may enable portable device 18 to send and receive information and operational commands with communications accessory 12 or any of the devices/networks interfaced with the communications accessory. Further, portable device 18 may include a power module 40 that powers the operation of the device. Power module 40 may include, for example, a transformer, a cord, a direct current or alternating current electrical power source, a solar power source, an induction power source, or any other system for interconnecting and energizing the device. Power module 40 may be connectable with power module 34 of communications accessory 12 for receiving a supply of power. For example, if portable device 18 is a wireless phone having a battery pack as power module 40, then communications accessory 12 may function as a battery charger when interconnected with the portable device. Additionally, portable device 18 may include one or more of a speaker, a receiver, a keypad, a display, an input/output, an answering machine, or function keys for controlling various operations of the device.

Figure 5:
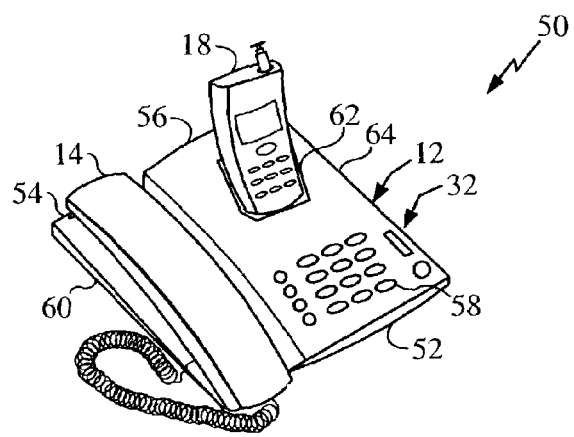
FIG. 5 is another embodiment of a communications accessory in the form of a docking station.

Referring to FIG. 5, another embodiment of a communications accessory or docking station 50 integrates communications accessory 12 and non-native device 14 into a unitary device. Docking station 50 includes a housing 52 that provides a mounting for, or encases, the components of communications accessory 12. Docking station 50 has a first cradle 54 for holding a handset of non-native device 14, such as a PSTN phone, and a second cradle 56 for holding portable device 18, such as a Qualcomm QSec®-800 wireless phone. Further, docking station 50 has numerous functional mechanisms 32, such as keypad 58, speaker 60, a power-on indicator light 62 and a first mode or secure call indicator light 64. Docking station 50, via switch system 22 (not shown), enables application module 20 (not shown) of portable device 18 to modify communications between non-native device 14 and, for example, a public switched telephone network.

Figure 6:
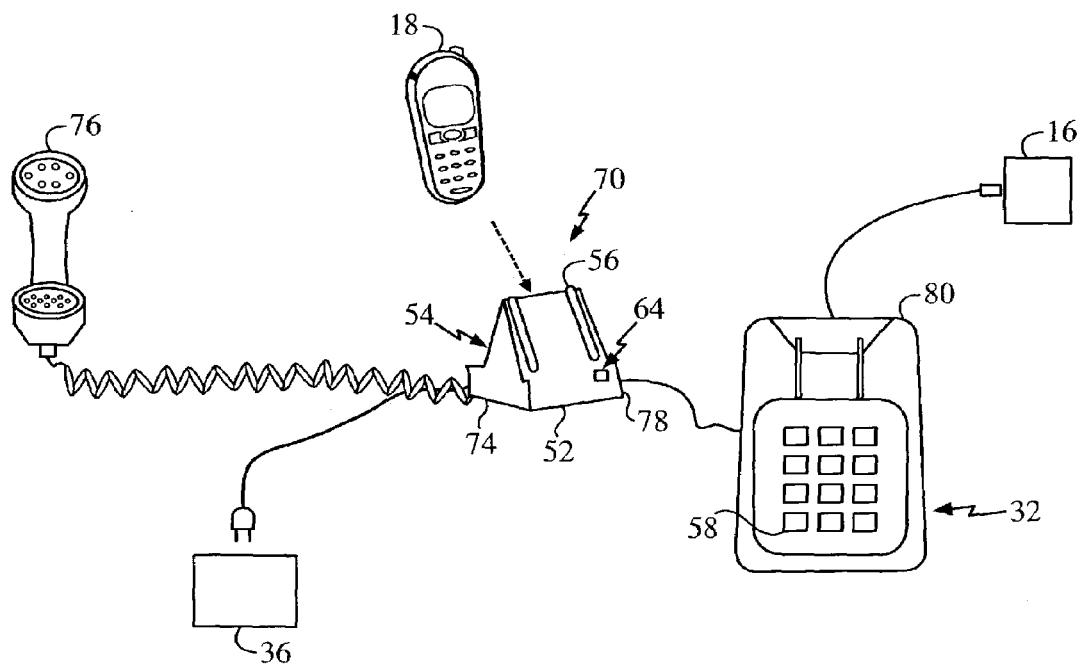
FIG. 6 is yet another embodiment of a communications accessory in the form of a dual desktop charger.

Referring to FIG. 6, yet another embodiment of a communications accessory or dual desktop charger 70 functions as a "bump-in-the-cord" communications module. In this embodiment, dual desktop charger 70 includes a housing 72 that encases switch system 22 (not shown) and forms first cradle 54, which defines a spare battery charging port, and second cradle 56 for holding portable device 18, such as a Qualcomm QSec®-800 wireless phone. Dual desktop charger 70 further includes a first wireline interface 74 for connecting to a first wireline device 76, such as a phone handset, and a second wireline interface 78 for connecting to a second wireline device 78, such as a phone base 80. Dual desktop charger 70 additionally includes first mode or secure call indicator light 64 to indicate when switch system 22 (not shown) is operating in the first or secure mode.

Figure 7:
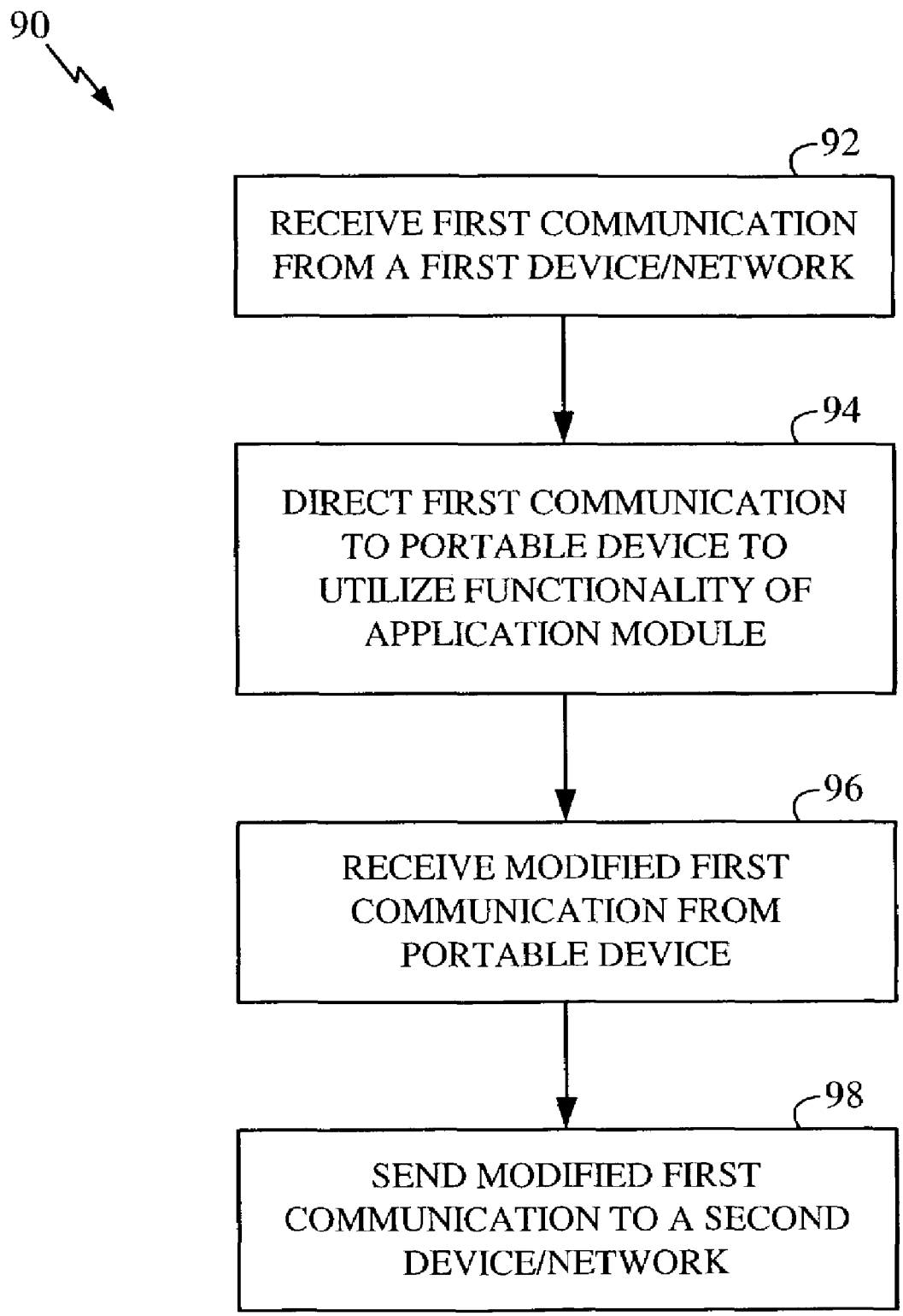
FIG. 7 is one embodiment of a method of modifying a communication between a non-native device and a non-native communications network, such as a public switched telephone network.

In operation, referring to FIG. 7, any embodiment of communications accessory 12, 50, 70 may be utilized in a method of modifying a communication between a non-native device and a non-native communications network 90. The method includes receiving a first communication from a first one of either the non-native device or the non-native communications network (Box 92). The modification method includes directing the first communication to a portable device or wireless telephone having an application module (Box 94). For example, directing such a communication could involve switching communications accessory 12, 50, 70 into a first mode of operation. Then, the communication could be operated on by the application module of the portable device, which could, for example, include a security application on a wireless phone. The method would further include receiving a second communication from the portable device or wireless telephone, where the second communication comprises a transformation of the first communication effected by the application module (Box 96). As discussed above, such a transformation could encompass the encryption or decryption of the communication by a security application. And, the method includes directing the second communication to a second one of either the non-native device or the non-native communications network, where the first one and the second one are not the same (Box 98). Thus, the communication would be sent by either the non-native device or the non-native communications network, and received by the non-sending one of the two. After sending the communication, but prior to its receipt, the communication is modified by an application module of a communications accessory, thereby transforming the communication. Such a transformation would include making a secure communication into a clear communication, or vice versa. Thus, embodiments of the above-described method would allow communications between a non-native device and a non-native communications network that are selectively modifiable by a portable device.

The above descriptions of embodiments of the present invention are provided to enable any person skilled in the art to make or use the invention. The various modifications to these embodiments will be readily apparent to those skilled in the art, and the generic principles defined herein may be applied to other embodiments without the use of the inventive faculty. Thus, the present invention is not intended to be limited to the embodiments disclosed herein, but is to be accorded the widest possible scope consistent with the principles and novel features disclosed herein and recited by the following claims.

What is claimed is:

1. A communications accessory, comprising:
   an interface system operable for communication with at least one non-native device, a portable device having an application module and a non-native communications network;
   a switch mechanism having at least a first mode and a second mode, wherein in the first mode the switch mechanism allows communications between the non-native device and the non-native communications network to be modified by the application module of the portable device, and wherein in the second mode the switch mechanism allows communications between the non-native device and the non-native communications network without modification by the application module of the portable device;
   wherein the switch mechanism receives a command signal from the portable device, the command signal directs the switch mechanism for operation in one of the first mode or the second mode; and
   the switch mechanism comprises a multiplexer having at least a first state and a second state, wherein the multiplexer in the first state routes communications between the non-native device and the non-native communications network through the portable device to achieve the first mode, wherein the multiplexer in the second state bypasses the portable device and routes communications between the non-native device and the non-native communications network to achieve the second mode, and the command signal is operable for changing the multiplexer between the first state and the second state.

2. The communications accessory of claim 1, wherein the application module comprises an application selected from the group consisting of a security application, an encryption/decryption application, a voice application, a data application, a group communications application, and a video application.

3. The communications accessory of claim 1, wherein the interface system comprises a portable device interface, a non-native device interface and a non-native communications network interface, wherein the portable device interface comprises a first connector for transmitting communications to and from the portable device, wherein the non-native device interface comprises a second connector for transmitting communications to and from the non-native device, and wherein the non-native communications network interface comprises a third connector for transmitting communications to and from the non-native communications network.

4. The communications accessory of claim 1, wherein the interface system comprises a modem.

5. The communications accessory of claim 1, further comprising a power module system operable for charging a first battery of the portable device.

6. The communications accessory of claim 5, wherein the interface system comprises a connector system for connecting the portable device to the interface system and the power module system.

7. The communications accessory of claim 5, wherein the power module system is operable for charging a second battery while charging the first battery of the portable device.

8. The communications accessory of claim 1, further comprising a functional mechanism to control or supplement the operation of the communications accessory.

9. The communications accessory of claim 8, wherein the functional mechanism comprises a mechanism selected from the group consisting of a mechanical input or output device, a haptic input or output device, a visual input or output device and an audio input or output device.

10. The communications accessory of claim 1, wherein the portable device comprises a device selected from the group consisting of a mobile phone, a wireless phone, a satellite phone, a personal digital assistant, a pager device, and a two-way communications device.

11. The communications accessory of claim 1, wherein the application module comprises a security application, and wherein for an outgoing communication in the first mode the interface system receives a clear communication from the non-native device and sends the clear communication to the application module, and wherein the interface system receives a secure communication from the application module and sends the secure communication to the non-native communications network, wherein the secure communication represents the clear communication as modified by the security application.

12. The communications accessory of claim 1, wherein the application module comprises a security application, and wherein for an incoming communication in the first mode the interface system receives a secure communication from the non-native communications network and sends the secure communication to the application module, and wherein the interface system receives a clear communication from the application module and sends the clear communication to the non-native device, wherein tie clear communication represents the secure communication as modified by the security application.

13. The communications accessory of claim 1, wherein the portable device comprises a wireless telephone and wherein the application module comprises a security application enabling encryption and decryption of communications between the non-native device and the non-native communications network.

14. A secure communications accessory, comprising:
an interface system operable for communication with at least one-non-native device, a portable device having a security application and a non-native communications network;
a switch mechanism having a first mode and a second mode, wherein in the first mode the switch mechanism routes communications between the non-native device and the non-native communications network through the security application of the portable device, and wherein in the second mode the switch mechanism connects the non-native device and the non-native communications network without routing communications through the security application of the portable device;
wherein the switch mechanism receives a command signal from the portable device, wherein the command signal directs the switch mechanism for operation in one of the first mode or the second mode; and
the switch mechanism comprises a multiplexer having at least a first state and a second state, wherein the multiplexer in the first state routes communications between the non-native device and the non-native communications network through the portable device to achieve the first mode, wherein the multiplexer in the second state bypasses the portable device and routes communications between the non-native device and the non-native communications network to achieve the second mode, and the command signal is operable for changing the multiplexer between the first state and the second state.

15. The secure communications accessory of claim 14, wherein the interface system comprises a modem.

16. The secure communications accessory of claim 14, further comprising a power module system operable for charging a battery associated with the portable device.

17. The secure communications accessory of claim 14, further comprising a functional mechanism to control or supplement the operation of the secure communications accessory.

18. The secure communications accessory of claim 17, wherein the functional mechanism comprises a mechanism selected from the group consisting of a mechanical input or output device, a haptic input or output device, a visual input or output device, and an audio input or output device.

19. The secure communications accessory of claim 14, wherein the portable device comprises a device selected from the group consisting of a mobile phone, a wireless phone, a satellite phone, a personal digital assistant, a pager device, and a two-way communications device.

20. A communications accessory, comprising:
a non-native device interface system connectable with a non-native device;
a public switched telephone network interface system connectable with a public switched telephone network;
a portable device interface system connectable with a portable device having an application module;
a switch system for transmitting communications between at least two of the non-native device interface system, the public switched telephone network interface system and the portable device interface system;
wherein the switch system comprises at least a first connection state and a second connection state, wherein the first connection state connects the non-native device interface system and the public switched telephone network interface system through the portable device interface system such that the transmitted communications are modified by the application module, and wherein the second connection state connects the non-native device and the public switched telephone network and bypasses the portable device interface system;
wherein the portable device comprises a wireless telephone and wherein the application module comprises a security application enabling encryption and decryption of the transmitted communications; and
a default state of the switching mechanism comprises the second connection state, and further comprising a signaling system between the wireless telephone and the communications accessory for determining a connection between the wireless telephone and the communications accessory and for changing between the first connection state and the second connection state.

21. The communications accessory of claim 20, further comprising an output device having at least one output corresponding to at least one of the first connection state and the second connection state.

22. The communications accessory of claim 20, wherein the public switched telephone network interface system comprises a modem.

23. The communications accessory of claim 20, further comprising a housing having an open configuration exposing at least the switch system and a closed configuration for encasing at least the switch system, and further comprising an indicator system associated with the housing, wherein the indicator system indicates whether or not the housing has been in the open configuration.

24. The communications accessory of claim 20, further comprising a power module system operable for charging a battery associated with the wireless telephone.

25. A communications system, comprising:
a communications accessory having a interface system for transmitting communications, wherein the communications accessory is connectable with at least a non-native device and a non-native communications network;
a portable device having an application module, wherein the potable device is connectable with the communications accessory;
wherein the interface system has at least a first mode and a second mode, wherein in the first mode the interface system allows communications between the non-native device and the non-native communications network to be modified by the application module of the portable device, and wherein in the second mode the interface system allows communications between the non-native device and the non-native communications network without modification by the application module of the portable device;

wherein the interface system receives a command signal from the wireless telephone, and wherein the command signal directs the interface system for operation in one of the first mode or the second mode; and the interface system comprises a multiplexer having at least a first state and a second state, wherein the multiplexer in the first state routes communications between the non-native device and the non-native communications network through the wireless telephone to achieve the first mode, wherein the multiplexer in the second state bypasses the wireless telephone and routes communications between the non-native device and the non-native communications network to achieve the second mode, and the command signal is operable for changing the multiplexer between the first state and the second state.

26. The communications system of claim 25, wherein the portable device comprises a wireless telephone and wherein the application module comprises a security application enabling encryption and decryption of the transmitted communications when the interface system is in the first mode.

27. The communications system of claim 25, wherein for an outgoing communication in the first mode the interface system receives a clear communication from the non-native device and sends the clear communication to the security application, and wherein the interface system receives a secure communication from the security application and sends the secure communication to the non-native communications network, wherein the secure communication represents the clear communication as modified by the security application.

28. The communications system of claim 25, wherein for an incoming communication in the first mode the interface system receives a secure communication from the non-native communications network and sends the secure communication to the security application, and wherein the interface system receives a clear communication from the security application and sends the clear communication to the non-native device, wherein the clear communication represents the secure communication as modified by the security application.

29. The communications system of claim 26, wherein the interface system comprises a modem.

30. The communications system of claim 26, further comprising a power module system operable for charging a battery associated with the wireless telephone.

31. The communications system of claim 26, further comprising a functional mechanism to control or supplement the operation of the secure communications accessory.

32. The communications system of claim 31, wherein the functional mechanism comprises a mechanism selected from the group consisting of a mechanical input or output device, a haptic input or output device, a visual input or output device, and an audio input or output device.

33. A method of modifying a communication between a non-native device and a non-native communications network utilizing the communications accessory of claim 1.

34. A method of modifying a communication between a non-native device and a non-native communications network, comprising:

receiving a first communication from a first one of either the non-native device or the non-native communications network;

directing the first communication to a portable device having an application module;

receiving a second communication from the portable device, wherein the second communication comprises a transformation of the first communication effected by the application module;

directing the second communication to a second one of either the non-native device or the non-native communications network, where the first one and the second one are not the same;

receiving a command signal from the portable device; and changing a switch system between a first state and a second state based on the received command signal, the first state connects the non-native device and the non-native communications network through the portable device, and wherein the second state bypasses a connection to the portable device and connects the non-native device to the non-native communications network.

35. The method of claim 34, where the application module includes a security application operable for encrypting or decrypting a communication, and where the first communication comprises a clear transmission and the second communication comprises a secure transmission encrypted by the security application.

36. The method of claim 35, where the application module includes a security application operable for encrypting or decrypting a communication, and where the first communication comprises a secure transmission and the second communication comprises a clear transmission decrypted by the security application.

37. The method of claim 34, further comprising generating an output based on the state of the switch system, where the output signals the operation of at least one of the first state and the second state.

38. The method of claim 37, where the output is selected from the group consisting of an audible signal and a visual signal.

39. The method of claim 34, further comprising transmitting power to the portable device.

* * * * *